US007281259B2

(12) United States Patent
Takagi et al.

(10) Patent No.: US 7,281,259 B2
(45) Date of Patent: Oct. 9, 2007

(54) CHANNEL SELECTION DEVICE FOR USE IN A DIGITAL/ANALOG BROADCASTING RECEIVER FOR RECEPTION OF MAIN AND SUB CHANNELS

(75) Inventors: Toshihiro Takagi, Takatsuki (JP); Tsuyoshi Kamitani, Nishinomiya (JP); Kazuhide Ishihara, Kadoma (JP)

(73) Assignee: Funai Electric Co., Ltd., Daito-shi (JP)

( * ) Notice: Subject to any disclaimer, the term of this patent is extended or adjusted under 35 U.S.C. 154(b) by 1144 days.

(21) Appl. No.: 10/058,035

(22) Filed: Jan. 29, 2002

(65) Prior Publication Data

US 2002/0104102 A1   Aug. 1, 2002

(30) Foreign Application Priority Data

Jan. 31, 2001   (JP) .............................. 2001-024504

(51) Int. Cl.
*G06F 3/00* (2006.01)
*G06F 13/00* (2006.01)
*H04N 5/445* (2006.01)

(52) U.S. Cl. .......................... 725/38; 725/57; 348/734; 348/731; 348/732; 348/733

(58) Field of Classification Search ................. 725/38, 725/57
See application file for complete search history.

(56) References Cited

U.S. PATENT DOCUMENTS

| 5,410,326 | A | | 4/1995 | Goldstein |
| 5,461,427 | A | | 10/1995 | Duffield et al. |
| 5,982,411 | A | * | 11/1999 | Eyer et al. ..................... 725/49 |
| 6,075,575 | A | * | 6/2000 | Schein et al. ................ 348/734 |
| 6,084,643 | A | | 7/2000 | Kishtaka et al. |
| 6,084,645 | A | | 7/2000 | Park et al. |
| 6,104,436 | A | | 8/2000 | Lee |
| 6,215,530 | B1 | | 4/2001 | Wasilewski |
| 6,249,320 | B1 | * | 6/2001 | Schneidewend et al. ..... 348/569 |
| 6,313,886 | B1 | * | 11/2001 | Sugiyama .................... 348/731 |
| 6,387,078 | B1 | | 4/2002 | Lasky |
| 6,396,523 | B1 | | 5/2002 | Segal et al. |
| 6,483,547 | B1 | * | 11/2002 | Eyer ........................... 348/473 |
| 6,490,001 | B1 | | 12/2002 | Shintani et al. |

(Continued)

FOREIGN PATENT DOCUMENTS

JP   55-02760   2/1980

(Continued)

Primary Examiner—Chris Kelley
Assistant Examiner—Farzana E Hossain
(74) Attorney, Agent, or Firm—Crowell & Moring LLP

(57) ABSTRACT

A broadcasting receiver for receiving a digital broadcast of the invention has a sub-channel changing-dedicated operation key so that upon reception of an instruction sent from this operation key, such a sub-channel that is adjacent in a predetermined direction in the same main channel may be selected in switch-over. If the desired channel cannot be found in the predetermined direction when an upward channel-movement instruction is received, such a sub-channel is selected that has the largest or smallest channel number. Thus, it is possible to accommodate a digital broadcast that has a hierarchical construction consisting of the main channel and the sub-channels and also that has a frequently fluctuating channel configuration, thus avoiding a delay in time required for channel changing.

5 Claims, 5 Drawing Sheets

U.S. PATENT DOCUMENTS

| | | |
|---|---|---|
| 6,564,378 B1 | 5/2003 | Satterfield et al. |
| 6,590,618 B1 * | 7/2003 | Park et al. .................. 348/734 |
| 6,598,233 B1 | 7/2003 | Choi |
| 6,621,528 B1 * | 9/2003 | Kessler et al. ............... 348/734 |
| 6,661,472 B2 * | 12/2003 | Shintani et al. ............. 348/732 |
| 6,714,264 B1 * | 3/2004 | Kempisty ................... 348/732 |
| 6,731,345 B2 | 5/2004 | Lee |
| 6,766,526 B1 | 7/2004 | Ellis |
| 6,772,433 B1 * | 8/2004 | LaJoie et al. ................. 725/52 |
| 6,775,843 B1 | 8/2004 | McDermott |
| 6,817,027 B1 | 11/2004 | Curreri |
| 6,825,874 B1 | 11/2004 | Tripathy |
| 6,836,296 B1 | 12/2004 | Terakado et al. |
| 7,050,117 B2 | 5/2006 | Takagi et al. |
| 2001/0052124 A1 * | 12/2001 | Kim et al. .................... 725/39 |
| 2002/0089603 A1 | 7/2002 | Onomatsu |
| 2002/0097164 A1 * | 7/2002 | Takagi et al. ............... 340/825 |
| 2002/0101540 A1 | 8/2002 | Takagi et al. |
| 2002/0104085 A1 | 8/2002 | Takagi et al. |
| 2002/0104103 A1 | 8/2002 | Takagi et al. |
| 2002/0113895 A1 | 8/2002 | Takagi et al. |
| 2002/0171775 A1 | 11/2002 | Okabe |
| 2004/0133910 A1 | 7/2004 | Gordon et al. |
| 2004/0172661 A1 | 9/2004 | Yagawa et al. |
| 2005/0010947 A1 * | 1/2005 | Ellis .......................... 725/38 |
| 2005/0163148 A1 | 7/2005 | Kim et al. |

FOREIGN PATENT DOCUMENTS

| | | |
|---|---|---|
| JP | 04-227379 | 8/1992 |
| JP | 11-164214 | 6/1999 |
| JP | 11-275476 | 10/1999 |
| JP | 2000-165766 | 6/2000 |

* cited by examiner

CHANNEL SELECTION DEVICE FOR USE IN A DIGITAL/ANALOG BROADCASTING RECEIVER FOR RECEPTION OF MAIN AND SUB CHANNELS

BACKGROUND OF THE INVENTION

The invention relates to a channel selection device used in a digital/analog broadcasting receiver and a digital/analog broadcasting receiver equipped with the same.

There has conventionally been available such a channel selection device used in digital/analog broadcasting receivers that permits the user to use input device to select a desired channel and decide whether this channel is of digital or analog broadcasting by referencing a digital/analog channel table listing the channels capable of viewing digital/analog broadcasts based on a digitally input channel number or using the channel UP/DOWN keys, thus causing a tuner thereof to receive a broadcasting signal of the desired channel (see, for example, Japanese Unexamined Patent Publication No. 11-164214).

Although, TV broadcasts are typically put on an air in analog origination, recently such digital broadcasts are originated and prevailing rapidly that are represented by a BS (Broadcasting Satellite) digital broadcast capable of improved high-picture-quality and multi-channel broadcasting and a CS (Communications Satellite) digital broadcast. The digital broadcasts in the North America, for example, are standardized by the ATSC (Advanced Television Systems Committee) to be originated through a physical channel different from analog broadcasting. In these broadcasts, many digital broadcasts are originated from the same or the same system of a broadcasting station as that for the conventional analog broadcasts, in which case to improve ease-to-use of the users accustomed to the conventional analog broadcasting channels, such a virtual channel that is assigned the same channel number as that for the conventional analog broadcasting is used in operation to enable channel selection and display.

Also, in digital broadcasting, each channel is assigned a carrier wave of a predetermined frequency band different from that of analog broadcasting. This channel is referred to as a main channel, which each contains one or a plurality of sub-channels for originating contents. The configuration of the sub-channels changes with a broadcasting time band, one of which is exemplified in FIG. 5 which shows a configuration of the sub-channels in a time band (8:00 PM to 12:00 PM) that has a main channel "4".

In FIG. 5, in broadcasting, sub-channels of Nos. 0 to 4 are selected for 8:00 to 9:00 PM, sub-channels of Nos. 0 and 1 are selected for 9:00 to 10:00 PM, sub-channels of Nos. 0 to 4 are selected for 10:00 to 11:00 PM, and sub-channels of Nos. 0 to 3 are selected for 11:00 to 12:00 PM. The sub-channel of No. 0 (physical channel No. of 4-0) involves analog broadcasting according to the NTSC (National Television Systems Committee) Standard, while the sub-channels of Nos. 1 to 4 (virtual channels Nos. 4-1 through 4-4) involve digital broadcasting. Also, a TV program broadcast through the channel 4-0 is a prior art analog-broadcast one, an SD (Standard Definition) program broadcast through the channels 4-1 through 4-4 are digital broadcast standard-picture-quality one, and an HD (High Definition) program broadcast through the channel 4-1 is a high-picture-quality digital broadcast.

In digital broadcasting, the information (hereinafter referred to as channel information) of such fluctuating channel configuration as described above is originated together with a video signal etc. In the digital broadcasting receiver, therefore, the digital broadcasting signal can be received at a tuner and then decoded at a digital decoder to thereby analyze a VCT (Virtual Channel Table) contained in the resultant decoded signal, thus obtaining the channel information of the relevant broadcast.

There is such a prior art digital/analog broadcasting receiver's channel selection device that decodes and analyzes a broadcasting signal to obtain a VCT (Virtual Channel Table) containing virtual channel information based on PSIP (Program System Information Protocol) and hold a channel map storing this table, so that when the user changes or select a channel, based on this channel map, an EPG (Electric Program Guide) functioning as an interface is used to display a channel selection display to thereby operate the key (e.g., UP key/DOWN key) at the body's operation panel or remote-control panel, thus enabling him to change or select the channel. Although this configuration eliminates the troublesome necessity of inputting a channel number, if there is no sub-channel adjacent in a keyed-in direction in the same main channel, this main channel is changed.

For example, between 11:00 PM and 12:00 PM in FIG. 5, if the user press the DOWN key thinking that channel "4-4" is present when receiving a broadcast through channel "4-3", the main channel (adjacent main channel, e.g. channel "5") is also changed. The main channel is actually changed by changing the frequency received at the tuner, obtaining a VCT containing sub-channel information in the adjacent main channel, and, based on this information, extracting any sub-channel's broadcasting signal. The VCT, in particular, is originated as mixed with the broadcasting signal for each predetermined time lapse, so that it takes a considerable time to undergo these steps to thereby change the main channel. When the channel UP/DOWN keys are thus used to change the main channel, therefore, the channel selection step takes a long time, thus providing inconvenience. Also, users may have a favorite main channel (broadcasting station) and so want to change only sub-channels in this main channel, in which case also the channel UP/DOWN keys may be used mistakenly to thereby change the main channel against the user's will.

SUMMARY OF THE INVENTION

This invention is made to solve the above-mentioned problems and it is an object of the invention to provide such a channel selection device used in digital/analog broadcasting receivers that has a hierarchical construction comprising the main channel and sub-channels, that can accommodate a digital broadcast having a frequently fluctuating channel configuration, that is equipped with a key for changing only the sub-channel, and also that can prevents a delay of time for changing the channel, thus improving the ease-of-use of the users.

In accordance with an aspect of the present invention, a digital broadcasting signal contains one or a plurality of sub-channels for originating contents for each main channel with the sub-channels being assigned a virtual channel containing the same channel number as the analog broadcasting channel number, thus permitting a user accustomed to analog broadcasts to select his desired channels without feeling a sense of incompatibility. The user operates the UP/DOWN keys on the input device to thereby give an instruction for selecting an upward/downward adjacent sub-channel. When having received the instruction from the UP/DOWN keys, the control unit changes the sub-channel in the upward/downward direction this instructed, on the basis of the channel information stored in the memory.

Even if no sub-channel is present in the instructed direction in the same main channel, this main channel is not changed but, instead, such a sub-channel is selected that is most distant from the pre-operation sub-channel. That is, when the user operated the UP key to find no sub-channel in the upward direction, a sub-channel having the largest sub-channel number is selected. When the user operated the DOWN key to find no sub-channel in the downward direction, on the other hand, a sub-channel having the smallest sub-channel number is selected. Thus, when the user operated the operation key repeatedly, the main channel can be searched in circulation to change the sub-channel to thereby prevent the channel changing time from being delayed, because the main channel is not changed if the user operated the operation key in such a direction where no sub-channel is present.

In accordance with another feature of the invention, a digital broadcasting signal contains one or a plurality of sub-channels for originating contents for each main channel with the sub-channels being assigned a virtual channel having the same number as an analog broadcasting channel number, thus permitting a user accustomed to analog broadcasts to select his desired channels without feeling a sense of incompatibility. The user operates the operation keys on the input device to thereby give an instruction for selecting an upward/downward adjacent sub-channel. When having received the instruction from the operation key, the control unit changes the sub-channel in a predetermined direction based on the channel information stored in the memory. If there is no sub-channel in the same main channel present in the predetermined direction, that same main channel is searched in circulation or in reciprocation to thereby select a sub-channel. The sub-channels are actually searched for in circulation by selecting such a sub-channel that has a sub-channel number most distant from the pre-operation sub-channel and in reciprocation by using the operation keys to select such a sub-channel that is adjacent in a direction opposite to the predetermined direction.

In accordance with a further feature of the invention, the cursor given in a list of the channel information displayed on the display device is interlocked with an instruction sent from the operation key operated by the user, thus enabling selecting a sub-channel at the cursor.

In accordance with a further feature of the invention, it is possible to select a channel using the channel UP/DOWN keys in the ATSC/NTSC receiver.

DETAILED DESCRIPTION OF THE PREFERRED EMBODIMENT OF THE PRESENT INVENTION

Figure 1:
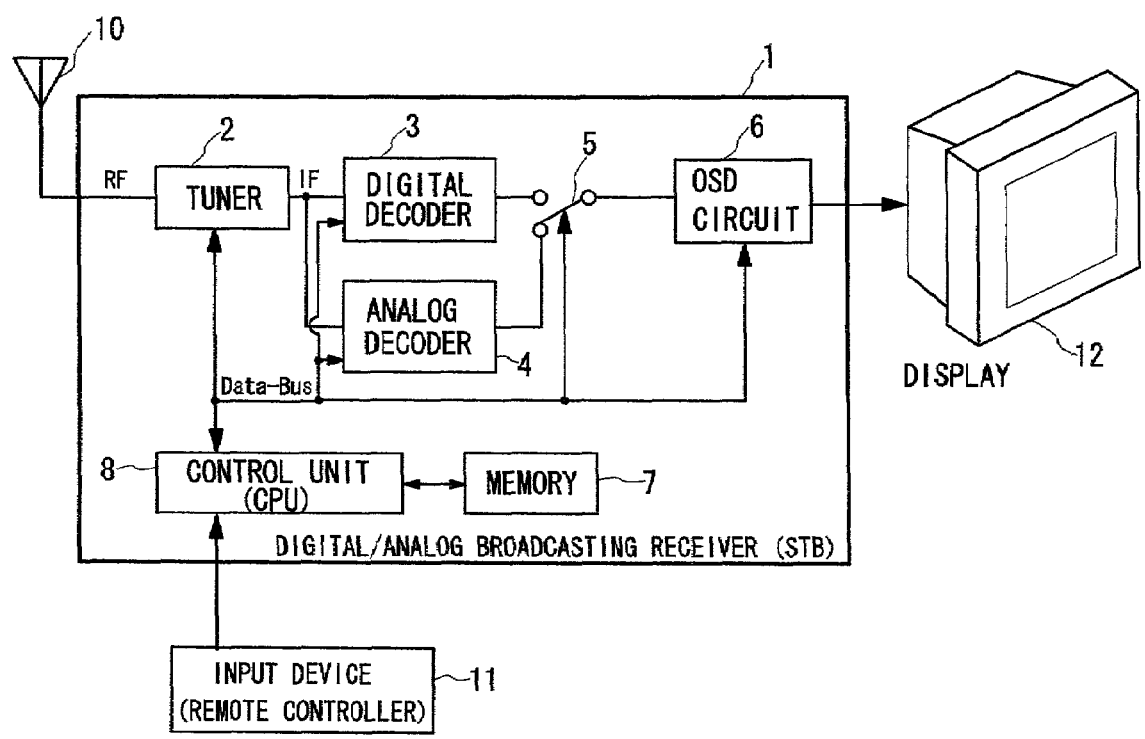
FIG. 1 is a block diagram for showing a broadcasting receiver according to one embodiment of the invention.

The following will describe a digital/analog broadcasting receiver related to one embodiment of the invention with reference to the drawings. FIG. 1 is a block diagram of the digital/analog broadcasting receiver. The receiver 1 is a set top box (STB) that receives at an antenna 10 an encoded radio-frequency (RF) digital/analog broadcasting signal originated from a TV broadcasting station to then display a list of the channel information which can be received by a display device 12 for displaying on a display an video signal contained in the broadcasting signal corresponding to operations for channel information display by the user by use of the body button or an input device 11 such as a later-described remote controller 30 shown in FIG. 2.

The receiver 1 comprises a tuner 2 for receiving a digital/analog broadcasting signal which is present in a frequency band corresponding to a desired channel, a digital decoder 3 and an analog decoder 4 for decoding the digital/analog broadcasting signal received at the tuner 2, a switch 5 for switching the broadcasting signals decoded by the digital decoder 3 and the analog decoder 4, an OSD circuit 6 for providing predetermined On-Screen Display (hereinafter abbreviated as OSD) at a display 12, a memory 7 for storing the originated frequencies of each digital broadcasting main channel and the channel configuration information, and a control unit 8 consisting of a CPU for controlling these sections of the receiver.

The tuner 2 is supplied with a digital/analog broadcasting signal received through the antenna 10 to then select a channel according to an instruction the user input to the control unit 8 from the input device 11 to thereby receive a digital/analog broadcasting signal of a frequency band corresponding to an input channel and modulate it into an intermediate frequency (IF) signal and then output it to the digital decoder 3 and the analog decoder 4. The digital decoder 3 and the analog decoder 4 decode the broadcasting signal received by the tuner 2. In the digital broadcasting channel configuration, each main channel is assigned each frequency band so that the sub-channels of the same main channel are used to originate broadcasting signals of the same frequency. However, the physical channels are different even in digital broadcasting using a virtual channel headed by the same number as that of analog broadcasting, so that the broadcasting signal is originated in a carrier wave of a different frequency band. If a user-selected channel through which the broadcasting signal is originated by the carrier wave of the different frequency band is of digital broadcasting (if the sub-channels are not of number "0"), the broadcasting signal is decoded by the digital decoder 3. If the user-selected channel is of analog broadcasting (if the sub-channels are of number "0"), the signal is decoded by the analog decoder 4.

The switch 5 receives an instruction from the control unit 8 to then output to the OSD circuit 6 a broadcasting signal decoded by either the digital decoder 3 or the analog decoder 4. The OSD circuit 6 in turn receives an instruction from the control unit 8 to then output the broadcasting signal to the display 12 and also output an OSD display signal for displaying a predetermined list of the receivable channel information. The memory 7 stores the information of each channel's frequency band and the channel configuration information as well as the information of OSD display at the time of shipment of the receiver.

The control unit 8 receives a user's input through the input device 11 to then control the sections through a data bus (Data-Bus) and cause the memory 7 to store the information of each channel's frequency band and the received channel information, thus referencing the information when required, for example, at the channel selection.

Also, the control unit 8 receives a user's instruction for channel changing to then cause the tuner 2 to receive a broadcasting signal containing channel configuration information and then analyzes a VCT (Virtual Channel Table) given as the channel information obtained by decoding this broadcasting signal at the digital decoder 3, thus obtaining a status signal contained therein. This status signal contains all the digital/analog sub-channel information of a virtual main channel. The control unit 8, therefore, can analyze that VCT to thereby obtain a virtual channel number consisting of the same number (main channel) as the previous channel number given to the same or the same system of broadcasting station originating the above-mentioned digital/analog broadcasting signal and a sub-channel number. That is, the control unit 8 can collectively obtain the digital/analog channel information originated from the same or the same system of broadcasting station. The control unit 8 stores thus obtained status signal in the memory 7, thus storing the channel information therein.

Further, the control unit 8 decides whether the broadcasting signal is present based on the status signal to provide predetermined OSD display or an output of a video program of a broadcast of a selected channel at the display 12. The display 12 may be a display of a TV receiver, a CRT, or a flat panel display such as an LCD (Liquid Crystal Display) or PDP (Plasma Display Panel). Although not shown, the receiver 1 is equipped with a D/A converter circuit for converting a digital signal into an analog one, so that the signal for the OSD display or image display is converted by this D/A converter circuit into an analog signal and then output to the display 12. Also, the D/A converter circuit may be built in the display 12. Note here that to display contents on the flat panel display, the signal bypasses the D/A converter signal and is output as digital signal as it is.

Figure 2:
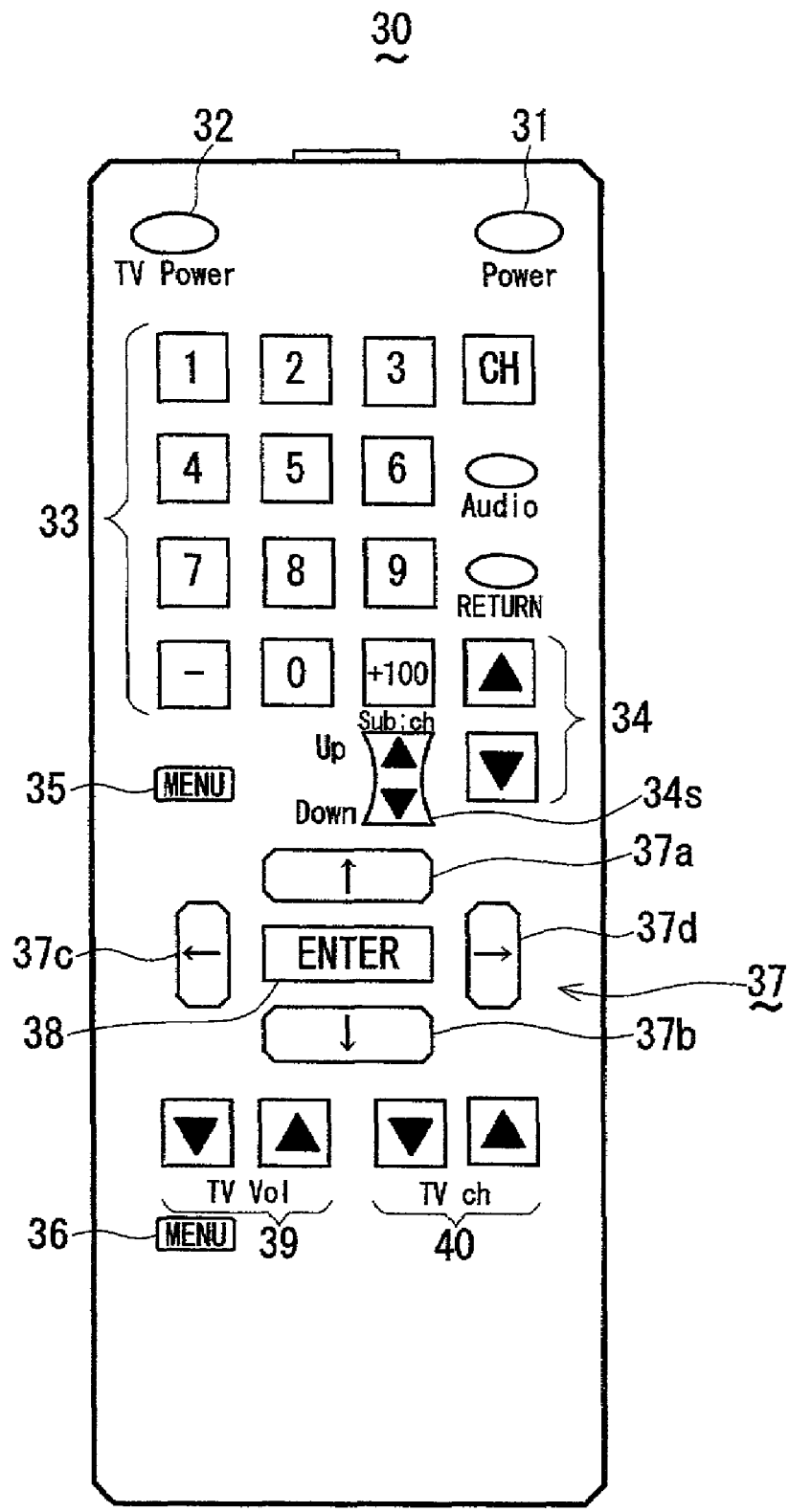
FIG. 2 is a plane view for showing a remote controller used in the broadcasting receiver.

The input device 11 is used to input a user's instruction to the control unit 8. The input device 11 may come in the body button provided on the front panel of the receiver 1 or a remote controller 30 such as shown in FIG. 2. The remote controller 30 is adapted to give an instruction in the form of an infrared ray etc. to operate the receiver 1 and the TV receiver. That is, it comprises power keys 31 and 32 for turning ON and OFF respectively the power of the receiver 1 and the TV receiver, a numeric keypad 33 for inputting a channel number of the receiver 1, a channel UP/DOWN key pair 34 for changing the channel, menu keys 35 and 36 for calling a menu display of the receiver 1 and the TV receiver respectively, keys 37 (37*a* to 37*d*) for moving the cursor in any desired directions, an entry (ENTER) key 38 for assuring an input, a sound-volume UP/DOWN key pair 39 for adjusting a sound volume of the TV receiver, and a channel UP/DOWN key pair 40 for changing the TV receiver channel.

Figure 3:
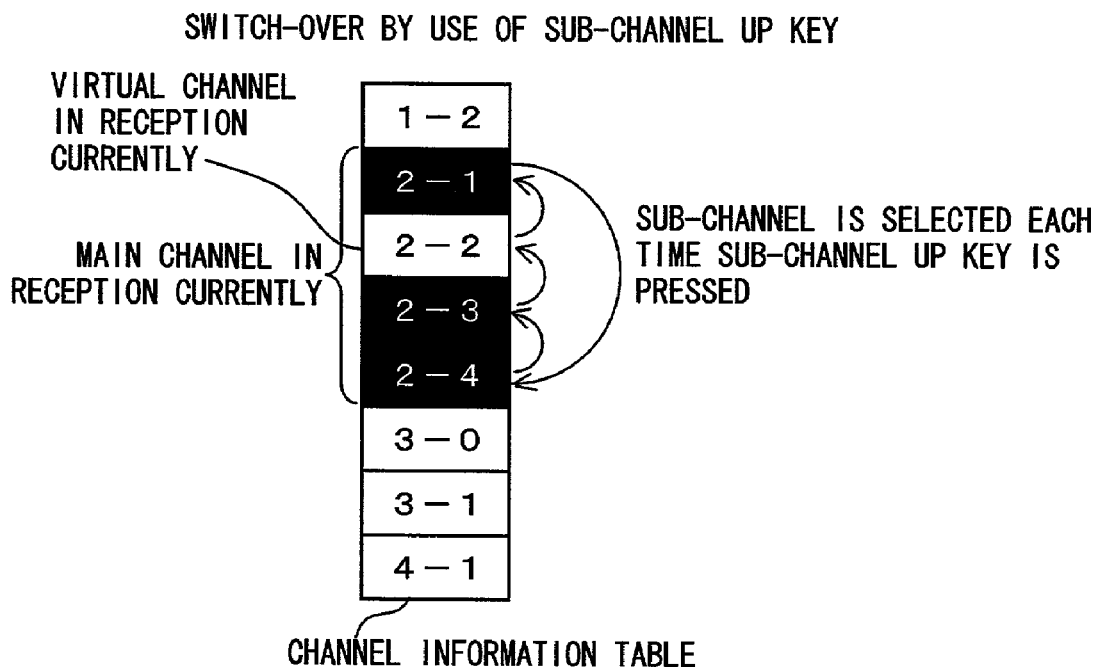
FIG. 3 is an illustration for showing a display for displaying a channel information table by the broadcasting receiver and a channel selecting order when the channel UP key is pressed.

Also, in addition to the channel UP/DOWN keys 34, the remote controller 30 is equipped with a sub-channel UP/DOWN key 34*s* for changing upward and downward sub-channels in one main channel. This sub-channel key has a tumbler construction so that pressing thereof to one side may move the sub-channel upward and pressing thereof to the other side may move it downward. The following will describe how to change a sub-channel using the sub-channel key 34*s* with reference to FIG. 3. FIG. 3 shows one example of the channel information table, in which example the user can operate the menu key 35 on the remote controller 30 to thereby give an instruction to the control unit 8, thus providing OSD display at the display 12 as an EPG (Electric Program Guide) as referencing the memory 7. In this case are displayed analog broadcasting channel "3-0", digital broadcasting channels provided with a virtual channel "1-2", "2-1", ..., "2-4", "3-1", and "4-1". In this display, channels "2-0" and "4-0" are not in the channel information table because their broadcasts are stopped and so their channel information is not stored in the memory 7. In the channel information table are arranged vertically the analog broadcasting channels for each main channel and the digital broadcasting virtual channels (in an ascending order) starting from the top. In this channel information table, channels "2-1" through "2-4" which are displayed reversed monochromatically indicate main channels through which a broadcast is being received currently, of which channel "2-2" displayed reversed monochromatically indicates a virtual channel through which a broadcast is being received currently.

On this OSD display, if the UP side of the sub-channel key 34*s* is pressed, the same main channel "2" is searched for upward adjacent sub-channels to thereby select channel "2-1". If the sub-channel key 34*s* is pressed, on the other hand, channel "2-4" assigned the largest sub-channel number in this main channel is selected because this main channel contains upward adjacent sub-channels. The arrows given to the right side in the channel information table indicate an order in which the channels to be switched are selected sequentially in the same main channel each time the sub-channel key 34*s* is operated. Note here that when the sub-channel key 34*s* is pressed also, the channel to be changed is just searched for in the opposite direction and is actually switched the same way. If the sub-channel key 34*s* is pressed on the DOWN side when a broadcast is being received through channel "2-4", channel "2-1" is selected having the smallest sub-channel number in the main channel because this main channel contains no downward adjacent sub-channels.

Figure 4:
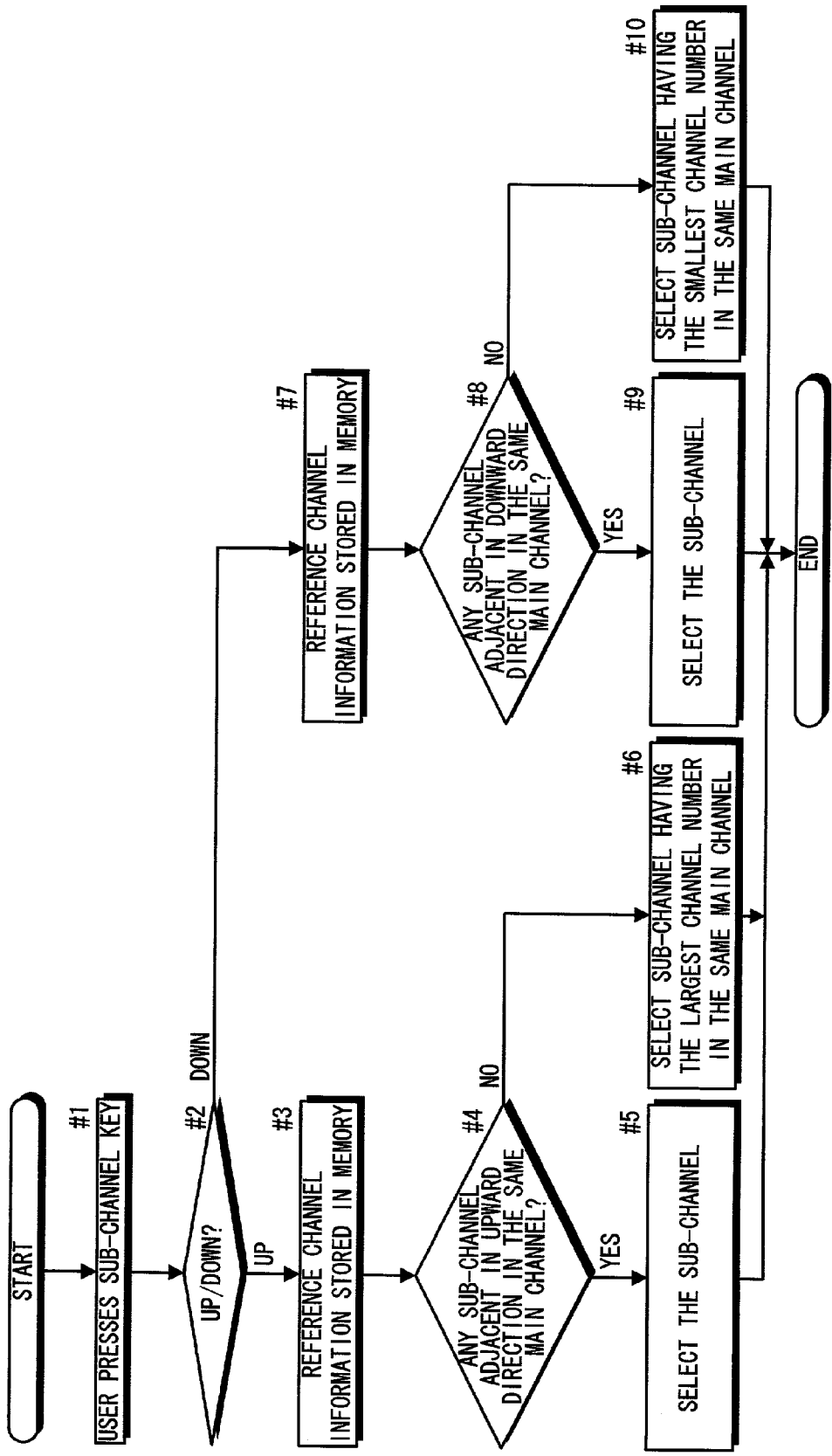
FIG. 4 is a flowchart for showing operations with the broadcasting receiver.

The following will describe the operations of the control unit 8 of the receiver 1 when it has received an instruction for changing the channel by the sub-channel key 34*s* on the remote controller 30 by the user, with reference to FIG. 4. First, when the sub-channel key 34*s* is pressed by the user (#1) and if it is pressed on the UP side (UP at #2), the control unit 8 references channel information stored in the memory 7 (#3) to search the main channel for upward adjacent sub-channels (#4). If such an adjacent sub-channel is found (YES is answered at #4), this sub-channel is selected (#5). Otherwise (NO is answered at #4), a sub-channel having the largest sub-channel number in the main channel is selected (#6).

If the sub-channel key 34*s* is pressed on the DOWN side (DOWN at #2), it references the channel information stored in the memory 7 (#7), it searches the main channel for downward adjacent sub-channels (#8). If such an adjacent sub-channel is found (YES is answered at #8), this sub-channel is selected (#9). Otherwise (NO is answered at #8), a sub-channel having the smallest sub-channel number in the main channel is selected (#10). Thus, it is possible to select sub-channels by searching the main channel for these sub-channels in circulation each time the sub-channel key 34*s* is inputted by the user.

The invention is not limited the configuration of this embodiment but may have a variety of variants; for example, although this embodiment exemplified the sub-channel key 34s provided separately as a UP/DOWN operation-dedicated key, the channel UP/DOWN keys 34 may be provided with the function of the sub-channel key in a mode switch-over configuration.

Figure 5:
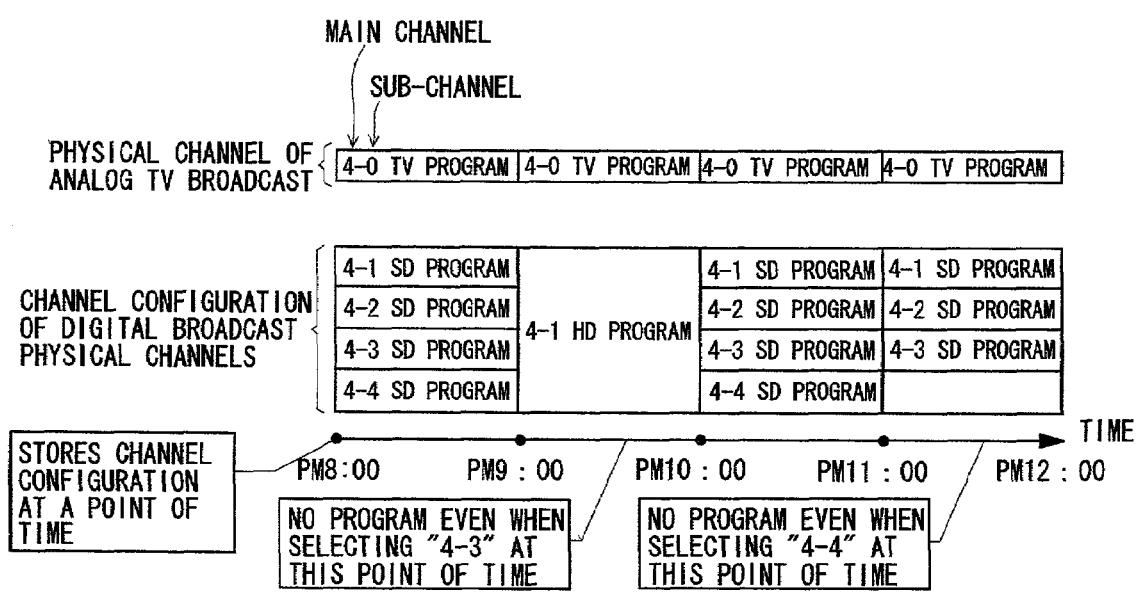
FIG. 5 is an illustration for showing a configuration of channels for digital broadcasts received by the broadcasting receiver.

Also, the sub-channel to be selected at #6/#10 in FIG. 5 is not limited to those having the largest/smallest sub-channel number but may be such a sub-channel that is adjacent in a direction opposite to that by the key-in operation. In this case, the main channel is searched in reciprocation for an appropriate sub-channel. Further, in this sub-channel selection, digital sub-channel "1" having the smallest sub-channel number may be to be selected. This sub-channel "1" is generally operated by the ATSC Standard in such a manner as to originate a digital broadcast having the same contents as an analog broadcast through sub-channel "0", thus being expected to have the largest viewing request. In this example, therefore, such a sub-channel that has the largest viewing request is selected preferentially.

Further, the channel information table shown in FIG. 3 may be displayed in an OSD manner at the display 12 when the sub-channel key 34s on the remote controller 30 is operated to give a channel changing instruction to the control unit 8. Still further, in this case, a received image may be immediately output to the display 12 without providing OSD display of the channel information table when a sub-channel changing instruction is received. Still further, the receiver 1 may be built in the body of a TV receiver or a video cassette recorder (VCR).

Thus, the invention makes it possible to change only sub-channels in the same main channel to thereby avoid a delay in channel selection owing to changing of the main channel, thus enabling rapid channel selection. Also, each time the user operates any of the operation keys, the sub-channels can be searched for in circulation in a user-instructed direction for sequential selection, so that the user can operate the device intuitively, thus improving the operability. Further, when a user who has his favorite main channel wishes to change only sub-channels in this main channel, he can select any one of the sub-channels comfortably.

What is claimed is:

1. A channel selection device used in a digital/analog broadcasting receiver comprising:
   a receiver for receiving an encoded digital/analog broadcasting signal originated from a broadcasting station,
   a digital/analog decoder for decoding the digital/analog broadcasting signal received from the receiver and then outputting the signal to a display device for displaying an image,
   a memory for storing channel information contained in the broadcasting signal decoded by the digital decoder,
   a control unit for controlling the sections of the receiver, and an input device for inputting a user's instruction for channel selection to the control unit,
   wherein the device receives a digital broadcast and an analog broadcast which are originated through different channels, the digital broadcast has, in one main channel, one or a plurality of sub-channels for originating contents therethrough, the sub-channels are assigned virtual channels headed by the same channel number as the main channel in the analog broadcast and the control unit controls the device such that the receiver receives the broadcasting signal of a selected channel upon reception of the channel selection instruction from the input device, and the digital decoder decodes the received broadcasting signal, in order to obtain the channel information contained in the decoded broadcasting signal and then store the channel information in the memory, and
   wherein the input device includes an UP/DOWN key solely dedicated for instructing the control unit to select a sub-channel adjacent in upward/downward direction in the same main channel, and another UP/DOWN key for instructing the control unit to select a main channel in an upward/downward direction,
   wherein the control unit
      references the channel information stored in the memory to thereby select an upward/downward adjacent sub-channel in the main channel through which a broadcast is being received currently, each time the UP/DOWN key is operated;
      selects a sub-channel having the largest sub-channel number, when receiving the instruction by the UP key and not finding an upward adjacent channel in the main channel with reference to the channel information,
      selects a sub-channel having the smallest sub-channel number, when receiving the instruction by the DOWN key and not finding a downward adjacent channel in the main channel with reference to the channel information.

2. A channel selection device used in a digital/analog broadcasting receiver comprising:
   a receiver for receiving an encoded digital/analog broadcasting signal originated from a broadcasting station,
   a digital/analog decoder for decoding the digital/analog broadcasting signal received from the receiver and then outputting the signal to a display device for displaying an image,
   a memory for storing channel information contained in the broadcasting signal decoded by the digital decoder,
   a control unit for controlling the sections of the receiver, and an input device for inputting a user's instruction for channel selection to the control unit,
   wherein the device receives a digital broadcast and an analog broadcast which are originated through different channels, the digital broadcast has, in one main channel, one or a plurality of sub-channels for originating contents therethrough, the sub-channels are assigned virtual channels headed by the same channel number as the main channel in the analog broadcast, and the control unit controls the device such that the receiver receives the broadcasting signal of a selected channel upon reception of the channel selection instruction from the input device and the digital decoder decodes the received broadcasting signal, in order to obtain the channel information contained in the decoded broadcasting signal and then store the channel information in the memory, and
   wherein the input device includes an operation key that is solely dedicated for instructing the control unit to select a sub-channel adjacent in upward/downward direction in the same main channel, and another operation key for instructing the control unit to select a main channel in a upward/downward direction,
   wherein the control unit references the channel information stored in the memory to thereby select an upward/downward adjacent sub-channel in the main channel through which a broadcast is being received currently, each time the operation key is operated, and
   wherein the control unit searches the main channel currently received in reciprocation for the sub-channel to be selected when there is not the upward/downward adjacent sub-channel in the channel information, wherein the search in reciprocation is a search for an adjacent sub-channel in an opposite direction from a direction selected by the operation key.

3. The channel selection device used in the digital/analog broadcasting receiver according to claim 2, further comprising an OSD (On-Screen Display) output circuit for providing OSD display of a list of the channel information stored in the memory in such a state that the digital and analog broadcasts thereof are mixed, on the display device wherein the list of the channel information is displayed in a vertically/horizontally arranged state in order of channel number, and a cursor for selecting the channels as interlocked with the instruction by use of the operation key is indicated in the list of the channels displayed on the display device in an OSD manner.

4. The digital/analog broadcasting receiver equipped with the channel selection device according to claim 2, for receiving a digital broadcast according to the ATSC (Advanced Television Systems Committee) standard and an analog broadcast according to the NTSC (National Television Systems Committee) Standard.

5. A method for channel selection, the method comprising the acts of:

receiving a main channel selection instruction from a main channel selection key;

receiving a sub-channel selection instruction from a key that is solely dedicated to sub-channel selection to select a sub-channel of the main channel;

determining whether the sub-channel selection command is an UP or DOWN selection instruction;

selecting a sub-channel having the largest sub-channel number when the received sub-channel selection instruction is an UP instruction and an upward adjacent channel is not found in the main channel; and selecting a sub-channel having the smallest sub-channel number when the received sub-channel selection instruction is a DOWN instruction and a downward adjacent channel is not found in the main channel.

* * * * *